(12) United States Patent
Cernasov

(10) Patent No.: US 7,679,610 B2
(45) Date of Patent: Mar. 16, 2010

(54) LCD TOUCHSCREEN PANEL WITH EXTERNAL OPTICAL PATH

(75) Inventor: Andrei Cernasov, Ringwood, NJ (US)

(73) Assignee: Honeywell International Inc., Morristown, NJ (US)

( * ) Notice: Subject to any disclaimer, the term of this patent is extended or adjusted under 35 U.S.C. 154(b) by 652 days.

(21) Appl. No.: 11/528,404

(22) Filed: Sep. 28, 2006

(65) Prior Publication Data

US 2008/0079687 A1 Apr. 3, 2008

(51) Int. Cl.
*G06F 3/042* (2006.01)

(52) U.S. Cl. ...................................... 345/175
(58) Field of Classification Search ................. 345/175
See application file for complete search history.

(56) References Cited

U.S. PATENT DOCUMENTS

| | | | |
|---|---|---|---|
| 4,345,248 A | 8/1982 | Togashi et al. | |
| 5,105,185 A | 4/1992 | Nakanowatari et al. | |
| 5,105,186 A | 4/1992 | May | |
| 6,630,928 B1 | 10/2003 | McIntyre et al. | |
| 6,864,882 B2 * | 3/2005 | Newton | 345/173 |
| 7,138,986 B2 | 11/2006 | Ohtsuka | |
| 7,265,747 B2 | 9/2007 | Martin | |
| 2001/0020578 A1 * | 9/2001 | Baier | 200/600 |
| 2001/0050677 A1 | 12/2001 | Tosaya | |
| 2003/0227446 A1 | 12/2003 | Ohtsuka | |
| 2004/0140961 A1 * | 7/2004 | Cok | 345/175 |
| 2005/0162381 A1 * | 7/2005 | Bell et al. | 345/156 |
| 2006/0227120 A1 | 10/2006 | Eikman | |

OTHER PUBLICATIONS

Cernasov, Andrei, "LCD Touchscreen Panel With Scanning Backlight," U.S. Appl. No. 11/514,911, filed Sep. 5, 2006; published Mar. 6, 2008, U.S. Publication No. 2008-0055494-A1.
Cernasov, Andrei, "LCD Panel With Integral Touchscreen," U.S. Appl. No. 11/514,912, filed Sep. 5, 2006; published Mar. 6, 2008, U.S. Publication No. 2008-0055261-A1.
Cernasov, Andrei, "LCD Panel With Synchronized Integral Touchscreen," U.S. Appl. No. 11/515,011, filed Sep. 5, 2006; published Mar. 6, 2008, U.S. Publication No. 2008-0055495-A1.
Den Boer, Willem et al., "Active Matrix LCD with Integrated Optical touch Screen," SID '03 Digest, 2003.
United States Patent and Trademark Office, Non-Final Office Action mailed Sep. 18, 2008 for U.S. Appl. No. 11/514,911, filed Sep. 5, 2006; published Mar. 6, 2008, U.S. Publication No. 2008-0055494-A1.

(Continued)

*Primary Examiner*—Amr Awad
*Assistant Examiner*—Jarurat Suteerawongsa
(74) *Attorney, Agent, or Firm*—Ingrassia Fisher & Lorenz, P.C.

(57) ABSTRACT

A liquid crystal display (LCD) device (5) having an integrated touchscreen includes a probe light source (80) behind the liquid crystal (LC) layer (20) for transmitting a probe signal. The device further includes a probe light sensor (90) behind the LC layer for sensing the probe signal. An external optical path is provided whereby the probe signal traverses from the probe light source, across the touchscreen surface (1), and toward the probe light sensor. By sensing interruptions in the probe signal traversing the external optical path, using the probe light sensor, the LCD device is capable of detecting user contact with the touchscreen surface.

12 Claims, 10 Drawing Sheets

OTHER PUBLICATIONS

United States Patent and Trademark Office, Non-Final Office Action mailed Sep. 19, 2008 for U.S. Appl. No. 11/515,011, filed Sep. 5, 2006; published Mar. 6, 2008, U.S. Publication No. 2008-0055495-A1.

United States Patent and Trademark Office Non-Final Office Action mailed Mar. 6, 2009 for U.S. Appl. No. 11/514,911, filed Sep. 5, 2006; published Mar. 6, 2008; U.S. Publication No. 2008-0055494-A1.

United States Patent and Trademark Office Non-Final Office Action mailed May 26, 2009 for U.S. Appl. No. 11/515,011, filed Sep. 5, 2006, published Mar. 6, 2008; U.S. Publication No. 2008-0055495-A1.

United States patent and Trademark Office Final Office Action mailed Oct. 29, 2009 for U.S. Appl. No. 11/514,911, filed Sep. 5, 2006.

* cited by examiner

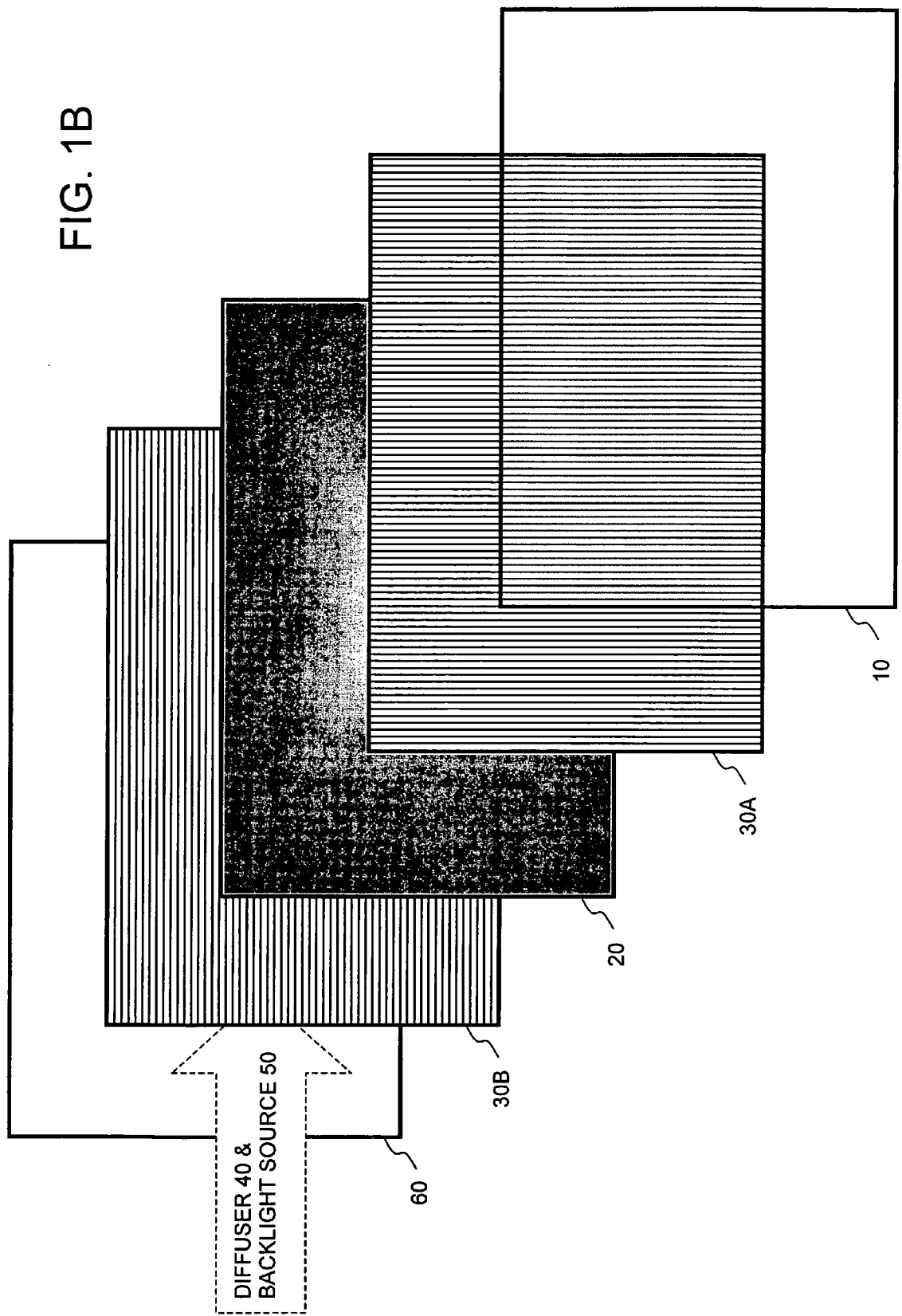

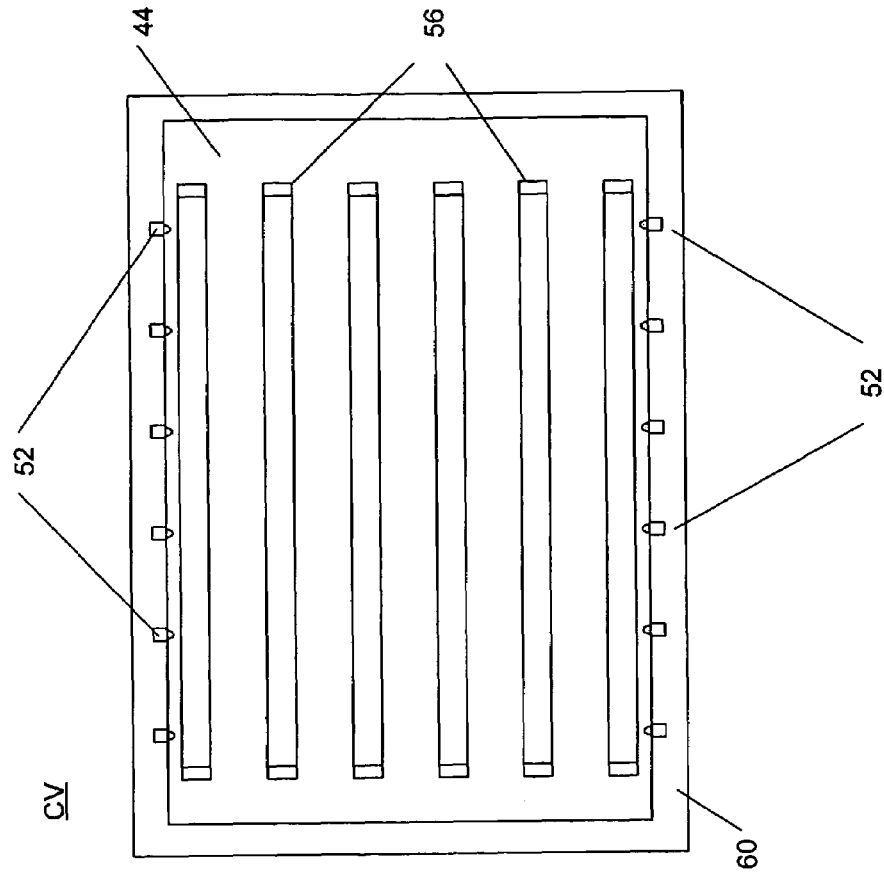
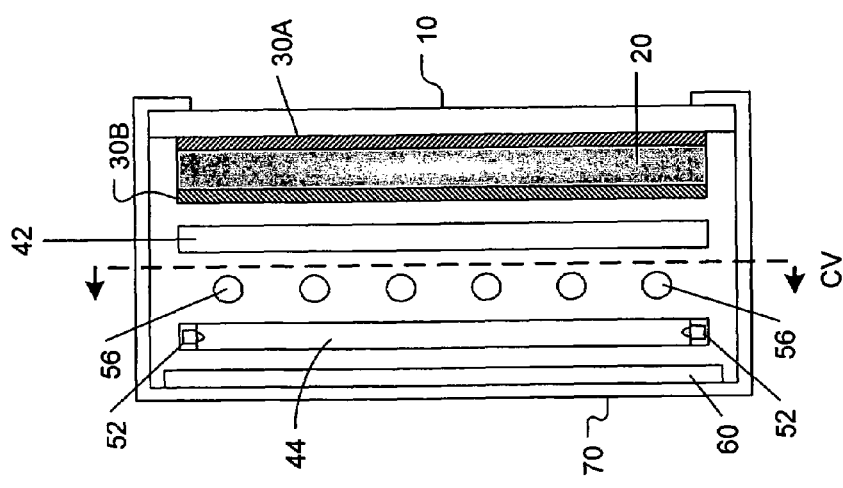
FIG. 2B
FIG. 2A

LCD TOUCHSCREEN PANEL WITH EXTERNAL OPTICAL PATH

CROSS-REFERENCES TO RELATED APPLICATIONS

The present invention is related to co-pending U.S. patent application Ser. No. 11/514,912, entitled "LCD PANEL WITH INTEGRAL TOUCHSCREEN," which was filed on Sep. 5, 2006; copending U.S. patent application Ser. No. 11/515,011, entitled "LCD PANEL WITH SYNCHRONIZED INTEGRAL TOUCHSCREEN," which was filed on Sep. 5, 2006; and copending U.S. patent application Ser. No. 11/514,911, entitled "LCD TOUCHSCREEN PANEL WITH SCANNING BACKLIGHT," which was filed on Sep. 5, 2006. The entire contents of the above-identified related applications are hereby incorporated by reference in their entirety.

FIELD OF THE INVENTION

The present invention relates to a liquid crystal display (LCD) panel with an integrated touchscreen, and more particularly, to providing the LCD panel with external probe signals for detecting user contact with a particular touchscreen key.

BACKGROUND OF THE INVENTION

For many types of interactive applications, touchscreens are ideal interface devices. This is because they are intuitive, reprogrammable, and capable of being environmentally sealed. Also, touchscreens occupy a relatively small amount of space. Thus, it would be desirable to incorporate touchscreen functionality in applications utilizing liquid crystal display (LCD) panels.

The configuration of a typical LCD device is illustrated in FIGS. 1A and 1B. As shown in FIG. 1A, a typical LCD device 1 includes a liquid crystal (LC) layer 20 sandwiched between two polarizing filters 30A and 30B (hereafter "polarizers"). The LC layer is protected by a transparent front protective sheet 10, e.g., a glass plate. For a backlit LCD device 1, behind the LC and polarizing layers are a light diffusing film 40 (hereafter "diffuser"), a backlight source 50, and a reflective surface 60. However, in a reflective-type LCD device 1, the diffuser 40 and backlight source 50 would be omitted (thus, these layers are illustrated by dotted lines in FIG. 1A). A casing or enclosure 70 is provided to hold the aforementioned layers in place. FIG. 1B illustrates an exploded view of the stack of LCD layers described above. The specification may collectively refer to these layers as the "LCD stack" of a backlit LCD device (including diffuser 40 and backlight source 50) or a reflective-type LCD device (without diffuser 40 or backlight source 50).

In a typical backlit LCD device (also referred to as a "transmissive" LCD device), the backlight is emitted directly from source 50 and reflected from reflective surface 60 to the diffuser 40. The diffuser 40 diffuses this light to make the intensity or brightness more uniform across the LCD. Polarizers 30A and 30B are cross-polarized with respect to each other.

Thus, the backlight polarized by polarizer 30B must be rotated to some extent by LC layer 20 in order to pass through polarizer 30A. The degree to which the LC layer 20 rotates the light is dependent upon the amount of voltage applied across the various liquid crystal molecules in the LC layer 20. For instance, a pair of electrodes (not shown) may be positioned across each LC cell to apply an appropriate voltage to "twist" the corresponding LC molecules, thereby rotating the backlight to pass through. In backlit LCD devices, numbers and characters are displayed according to the LC cells that allow light to pass through polarizers 30A and 30B.

FIGS. 2A and 2B illustrate the different types of backlight sources 50 that can be implemented in a typical backlit LCD device 1. Specifically, FIG. 2A illustrates a side view of a backlit LCD device 1, while FIG. 2B shows a cross-sectional view at CV.

As illustrated in FIGS. 2A and 2B, the backlight source 50 may include a combination of "pinpoint" light sources 52 (e.g., LED lamps) and/or cold cathode fluorescent lamps (CCFLs) 56. Furthermore, different types of diffusers 40 may be used. For instance, these figures show an edge-lit light guide/diffuser 44 dedicated specifically to the pinpoint LED sources 52. Also, a light-diffusing sheet 42 may be implemented in front of the CCFL sources 56.

As shown in FIGS. 2A and 2B, the pinpoint light sources 52 are configured to emit light into the edge-lit light guide/diffuser 44, which is situated parallel to the LC layer 20. As such, the edge-lit light guide/diffuser 44 is intended to distribute the light from the pinpoint light sources 52 more uniformly. The combination of the edge-lit light guide/diffuser 44 and LED light sources 52 is generally referred to as an LED edge-lit light guide assembly.

However, as mentioned above, an alternative to backlit LCD devices are reflective-type LCDs. In a reflective-type LCD device, the LC layer 20 is illuminated by external light. Referring again to FIGS. 1A and 1B, after passing through the LC layer 20 and polarizers 30A and 30B, the external light is reflected (and optionally diffused) by the reflective surface 60 back to the viewer. In such devices, the cells in the LC layer 20 are configured, by default, to allow light to pass through. Thus, numbers and characters are displayed using LC cells, which are charged by electrodes (not shown) to block light from passing through polarizers 30A and 30B.

Generally, previous attempts to utilize a touchscreen in conjunction with an LCD panel (backlit or reflective-type) require additional panels or layers to be added to the front protective sheet of the LCD device. This is disadvantageous because it reduces the amount of output light from the LCD, increases the complexity of the resultant device, and reduces overall system reliability.

SUMMARY OF THE INVENTION

Exemplary embodiments of the present invention are directed to a liquid crystal display (LCD) device with an integrated touchscreen, in which at least one probe signal source and at least one probe signal sensing device are built within the LCD stack behind the liquid crystal (LC) layer. An external optical path is provided between a probe signal source and probe signal sensing device. Specifically, the probe signal traverses from the probe signal source, across an external face of the touchscreen surface, to the probe signal sensing device via the optical path. Thus, the probe signal sensing device is capable of sensing interruptions in the probe signal traversing the optical path, which are caused by a user's touch on the touchscreen surface.

According to an exemplary embodiment, the external optical path between a probe signal source and probe signal sensing device may include a pair of reflective elements along the edges of the touchscreen surface. Specifically, one of the reflective elements may be configured to receive the probe signal from the source, and reflect it across the touchscreen surface. The other reflective element may be disposed at the other side of the touchscreen surface to reflect the signal back into the LCD stack, toward the sensing device. For example, each reflective element may comprise a mirror tilted approximately 45 degrees with respect to the touchscreen surface.

In a further exemplary embodiment, the portions of the LC layer beneath the reflective elements may be made opaque, with the exception of two small translucent openings for the probe signal. The translucent openings may be scanned along the corresponding edges of the touchscreen surface, thereby causing the probe signal to be scanned across the touchscreen surface along one of the xy axes. Thus, when an interruption in the probe signal is detected, the location of the user contact along this axis can be determined based on the scan location of the translucent openings.

To detect both xy coordinates of a user's point of contact, a pair of probe signals may be scanned across the x and y axes, respectively, of the touchscreen surface. For example, by disposing reflective elements along the top and bottom edges of the touchscreen surface, and along the left- and right-side edges of the touchscreen surface, external optical paths may be established in both the horizontal and vertical directions. By scanning a pair of translucent openings in both the vertical and horizontal direction, probe signals may be scanned across the touchscreen surface along both the x and y axes. Thus, when interruptions are detected in both probe signals being scanned, the x, y position coordinates of a user's touch may be determined.

Further aspects in the scope of applicability of the present invention will become apparent from the detailed description provided below. However, it should be understood that the detailed description and the specific embodiments therein, while disclosing exemplary embodiments of the invention, as provided for purposes of illustration only.

BRIEF DESCRIPTION OF THE DRAWINGS

A more complete understanding of the present invention will become apparent from the following description taken in conjunction with the accompanying drawings, which are given by way of illustration only and, thus, are not limitative of the present invention. In these drawings, similar elements are referred to using similar reference numbers, wherein:

FIGS. 1A and 1B illustrate the configuration of a typical liquid crystal display (LCD) device;

FIGS. 2A and 2B illustrate different types of backlight sources within typical backlit LCD devices;

DETAILED DESCRIPTION OF EXEMPLARY EMBODIMENTS

In order to integrate a touchscreen interface with a liquid crystal display (LCD) device, the present invention utilizes probe signals transmitted from within the stack of LCD layers to detect user contact with the touchscreen surface (e.g., the front protective sheet of the LCD device). An external optical path is provided for the probe signals across the touchscreen surface. A probe signal sensing device is disposed within the LCD stack to sense any interruption of the probe signal traversing across the external path. Through this sensing operation, the LCD device can detect user touches on the touchscreen surface, which interrupt the probe signal.

According to an exemplary embodiment, the source of the probe signals is a light source (hereafter "probe light source"), e.g., an LED, implemented behind the liquid crystal (LC) layer within the LCD casing or enclosure. Thus, the probe signal sensing device may comprise a light sensor (hereafter "probe light sensor") configured to produce intensity measurements of the probe light. To enhance detection properties, the probe light source may be modulated at a particular frequency or range of frequencies, and the probe light sensor may be configured to demodulate and measure such light.

The touchscreen surface may be used for displaying a plurality of touchscreen keys. It is contemplated that many different types of touchscreen applications could be implemented on the same LCD device. The type of touchscreen keys presented to the user, and the configuration (size, shape, etc.) thereof, are purely a matter of design choice and the requirements of a given touchscreen application.

Figure 1A:
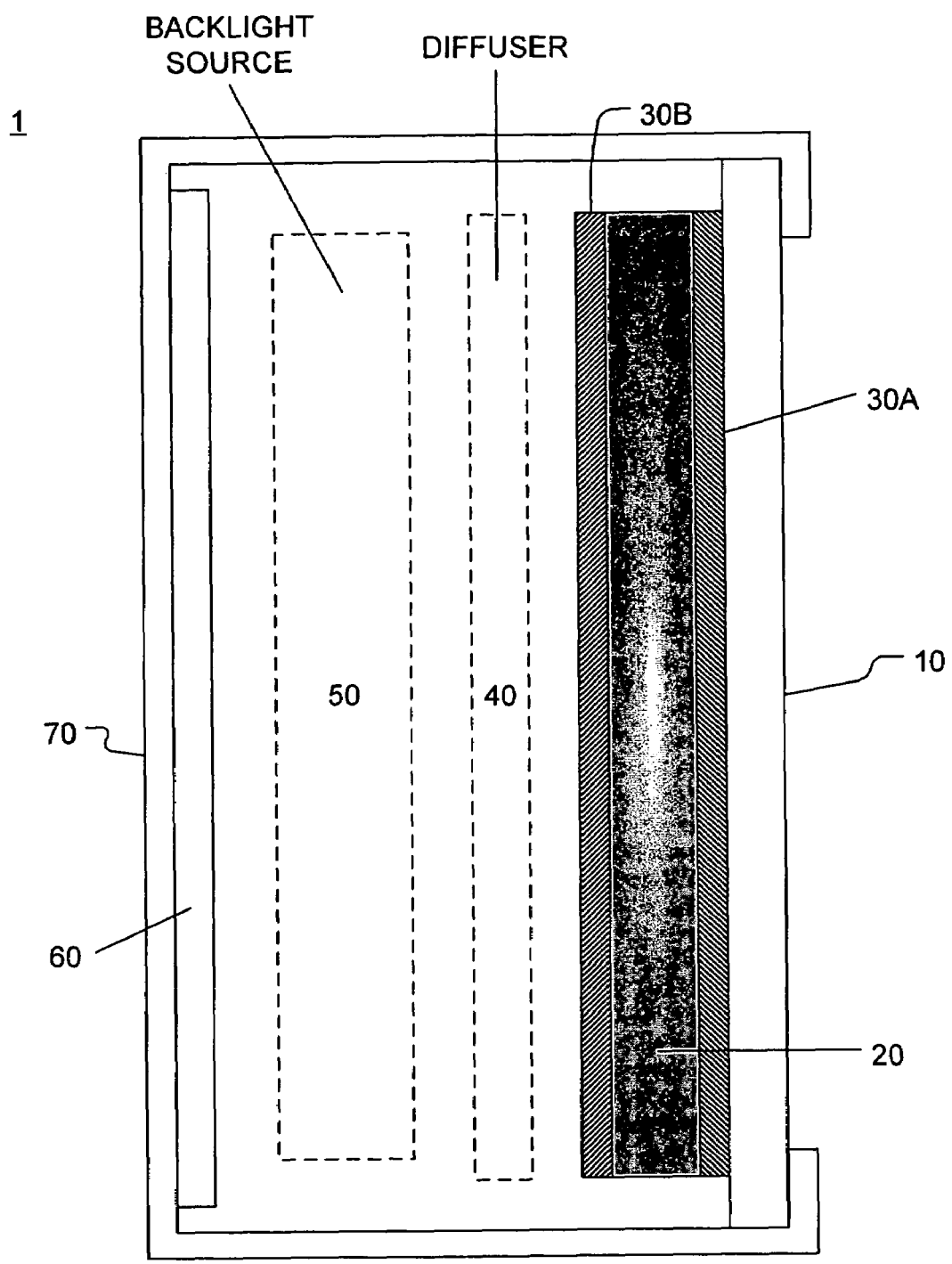
Figures 3A, 3B:
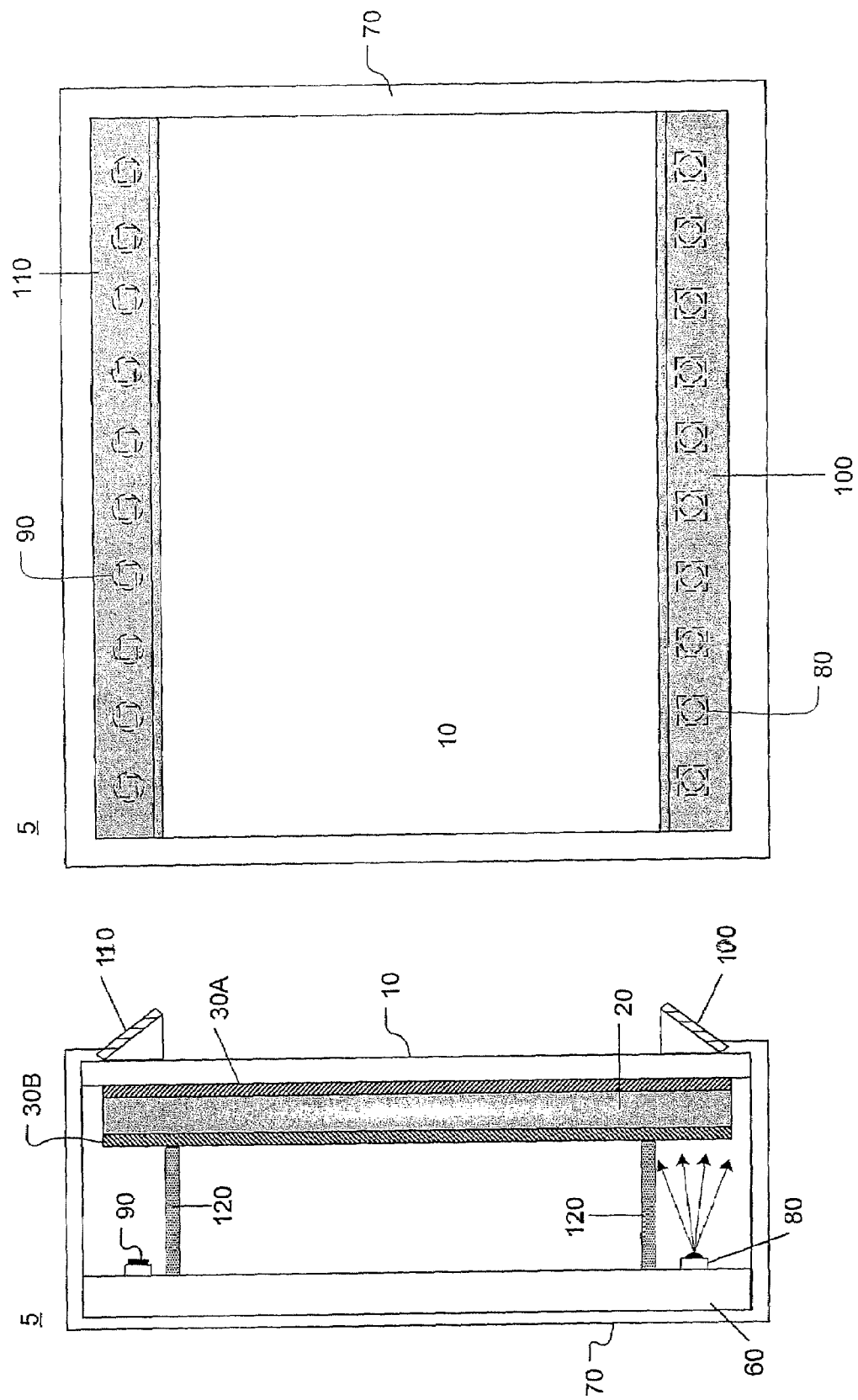
FIGS. 3A and 3B illustrate multiple views of an LCD device incorporating a probe light source and probe light sensing device along opposing edges within the LCD device, according to an exemplary embodiment of the present invention.

FIGS. 3A and 3B illustrate multiple views of an LCD device including a probe light source and sensing device, according to an exemplary embodiment of the invention.

Specifically, FIG. 3A illustrates a side view of the LCD device 5. As shown in FIG. 3A, the device 5 includes an LCD stack with a front surface 10 (or touchscreen surface), polarizers 30A and 30B, LC layer 20, and reflective surface 60. A casing 70 encloses the layers of the LCD stack. Also, within the LCD stack of FIG. 3A are a probe light source 80 and probe light sensing device 90 along opposing edges. The probe light source 80 and probe light sensing device 90 are partitioned off from other internal elements (e.g., backlight 50, etc.) by walls 120. The LCD device 5 further includes reflective elements 100 and 110 on the external side of the casing 70, disposed at the periphery of the touchscreen surface along opposing edges. The reflective elements 100 and 110 provide an external optical path for the probe light to traverse from the probe light source 80, across the external face of touchscreen surface 10, to the probe light sensing device 90.

FIG. 3B illustrates a front view of the LCD device 5, including the reflective elements 100 and 110, touchscreen surface 10, and casing 70. FIG. 3B illustrates probe light sources 80 along the bottom-side edge, using broken lines to indicate that these sources 80 are disposed within the LCD device 5 behind the reflective element 100. FIG. 3B further illustrates probe light sensing devices 90 along the top-side edge, using broken lines to indicate that these sensing devices 90 are within the LCD device 5 behind the reflective element 110.

According to an exemplary embodiment, each reflective element 100, 110 may be configured as a mirror strip, supported at an approximately 45 degree angle tilt with respect to the touchscreen surface (see FIG. 3A)

FIGS. 3A and 3B illustrate multiple probe light sources 80 across a particular edge (bottom), and multiple probe light sensing devices 90 along another edge (top). Particularly, these figures illustrate the probe light sources 80 as being pinpoint sources, e.g., frequency modulated light-emitting diodes (LEDs). As such, the probe light sensing devices 90 may be sensors that are configured to demodulate such light. However, it should be noted that other configurations for the probe light source(s) 80 and probe light sensing device(s) are possible, as will be contemplated by those of ordinary skill in the art. For instance, it is contemplated that a single probe light source 80 may be used. To increase uniformity, a diffuser may be placed over a single source 80. It is also possible to use only a single probe sensing device 90.

The external optical path will now be described in more detail, according to exemplary embodiments. The probe light is transmitted from source 80 through the LC layer 20 to the reflective element 100. The reflective element 100 is configured to reflect the probe light across the touchscreen surface 10 toward the reflective element 110. The reflective element 110 is configured to reflect the probe light toward the probe light sensing device 90.

Further, to increase the detecting ability of the LCD device 5, it may be advantageous to make the probe signal more granular. Thus, the peripheral portions of LC layer 20 underneath reflective elements 100 and 110, respectively, may be configured to provide a corresponding pair of narrow "openings" through which the probe light may pass. To do this, these peripheral portions of the LC layer 20 may be set to a state of opacity, blocking passage of the probe light, and narrow translucent openings may be provided within the respective opaque portions. Furthermore, by scanning these translucent openings, in tandem, across the corresponding edges of the touchscreen surface 10, the probe signal may be scanned across the touchscreen surface 10 along one of the xy axes (i.e., scanned horizontally or vertically).

Accordingly, an LCD device does not need to be reconfigured, or include additional elements, to use these translucent openings. Instead, the translucent openings are merely portions of the LC layer 20 that are programmed to be transparent by the device's 5 LCD controller (e.g., see FIG. 6).

Figure 4A:
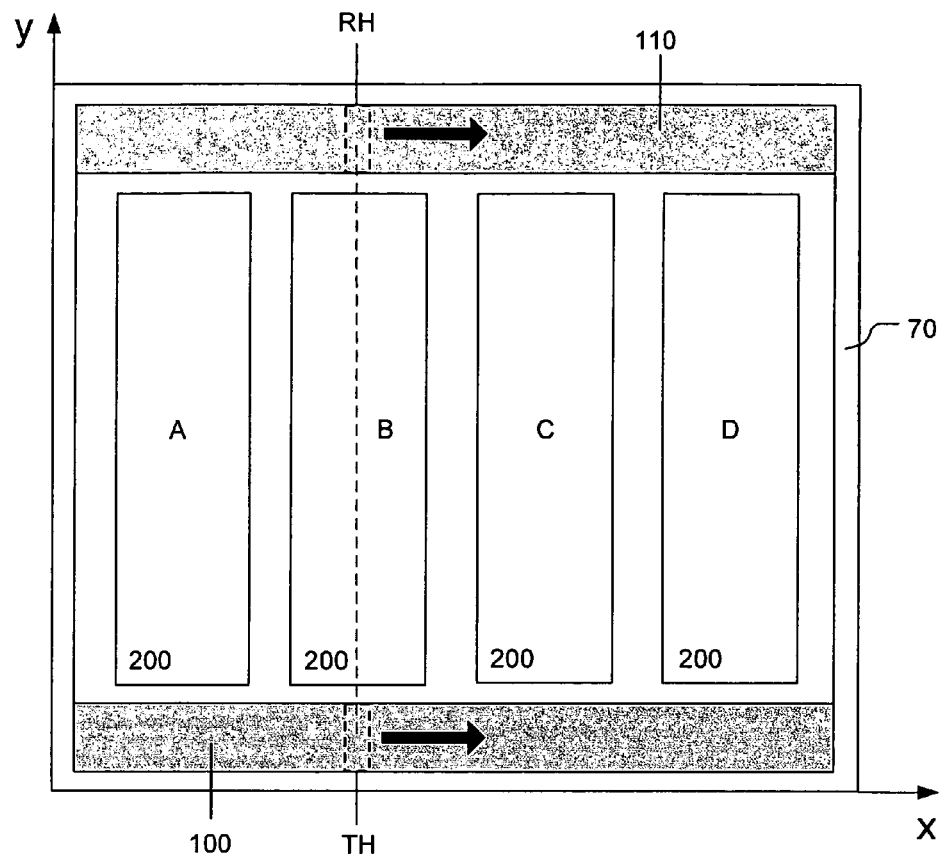
FIG. 4A illustrates the use of probe light openings in the LC layer to scan through a plurality of touchscreen keys to determine a horizontal location coordinate for the user contact, according to an exemplary embodiment of the present invention.

For example, FIG. 4A illustrates an exemplary embodiment where the reflective elements 100 and 110 are disposed along the bottom and top edges of the touchscreen surface 10 (similar to FIGS. 3A and 3B). A pair of translucent openings TH and RH (illustrated by broken lines) are provided in the portions of the LC layer 20 underneath the reflective elements 100 and 110, respectively. Thus, the probe light (illustrated by another broken line) is transmitted through the opening TH to the reflective element 100, reflected across the touchscreen surface 10 to reflective element 110, and received through opening RH. Further, as illustrated by the arrows, the translucent openings are scanned along the horizontal direction (x axis), thereby allowing the probe signal to be scanned along the same direction. For instance, at the current scan position of translucent openings TH and RH in FIG. 4A, any detected interruption in the probe light caused by user contact (as will be described in more detail below in connection with FIGS. 5A and 5B) would indicate that the touchscreen key 200 labeled "B" is being touched by the user.

Figure 4B:
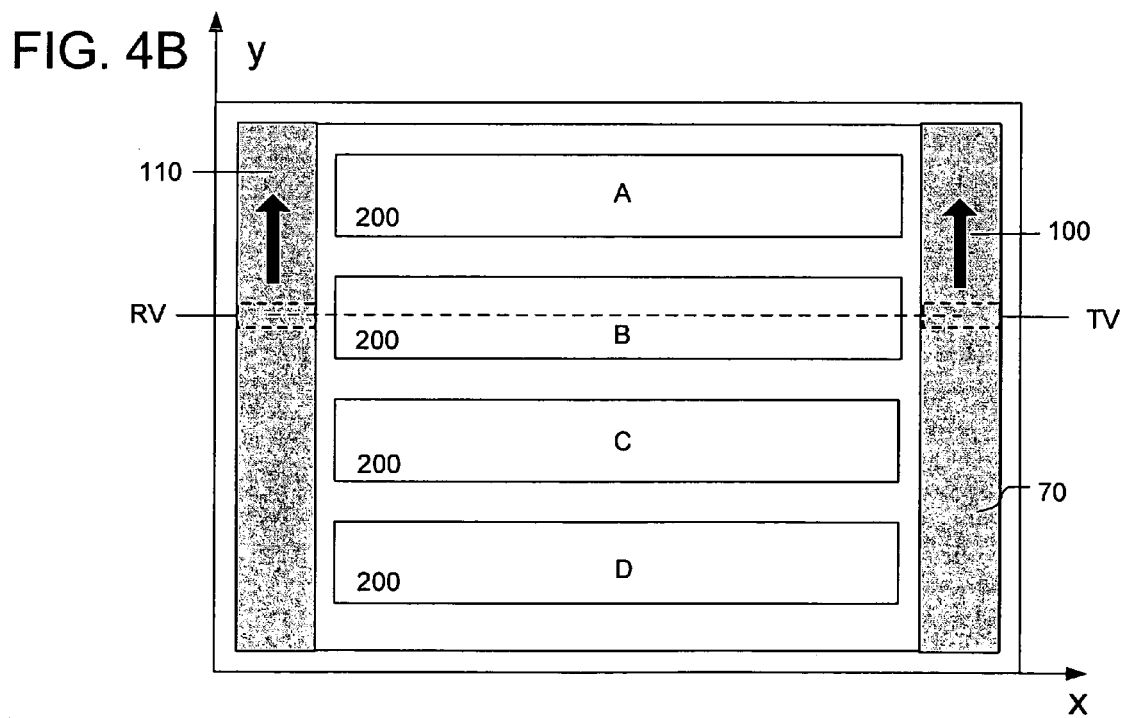
FIG. 4B illustrates the use of probe light openings in the LC layer to scan through a plurality of touchscreen keys to determine a vertical location coordinate for the user contact, according to an exemplary embodiment of the present invention.

FIG. 4B illustrates an alternative embodiment where the probe signal is scanned in the vertical direction. Thus, reflective elements 100 and 110 are disposed along the right- and left-side edges of the touchscreen surface. Further, the translucent openings TV and RV are provided in the opaque portions of the LC layer 20 underneath reflective elements 100 and 110, respectively. By simultaneously scanning the openings TV and RV in the vertical direction (i.e., along the y axis), the probe light is scanned across the touchscreen surface 10 in a vertical direction. As illustrated in FIG. 4B, at the current scan position of translucent openings TV and RV, any detected interruption in the probe light caused by user contact would indicate that the touchscreen key 200 labeled "B" is currently being touched.

FIGS. 3A and 3B illustrate a configuration where one optical path is provided for a probe light to traverse across the touchscreen surface 10 in a single direction (vertical). However, according to exemplary embodiments, the LCD device 5 may be configured with multiple optical paths going in different directions. For example, FIG. 3C illustrates an LCD device 5 having optical paths in the vertical and horizontal directions.

Figure 3C:
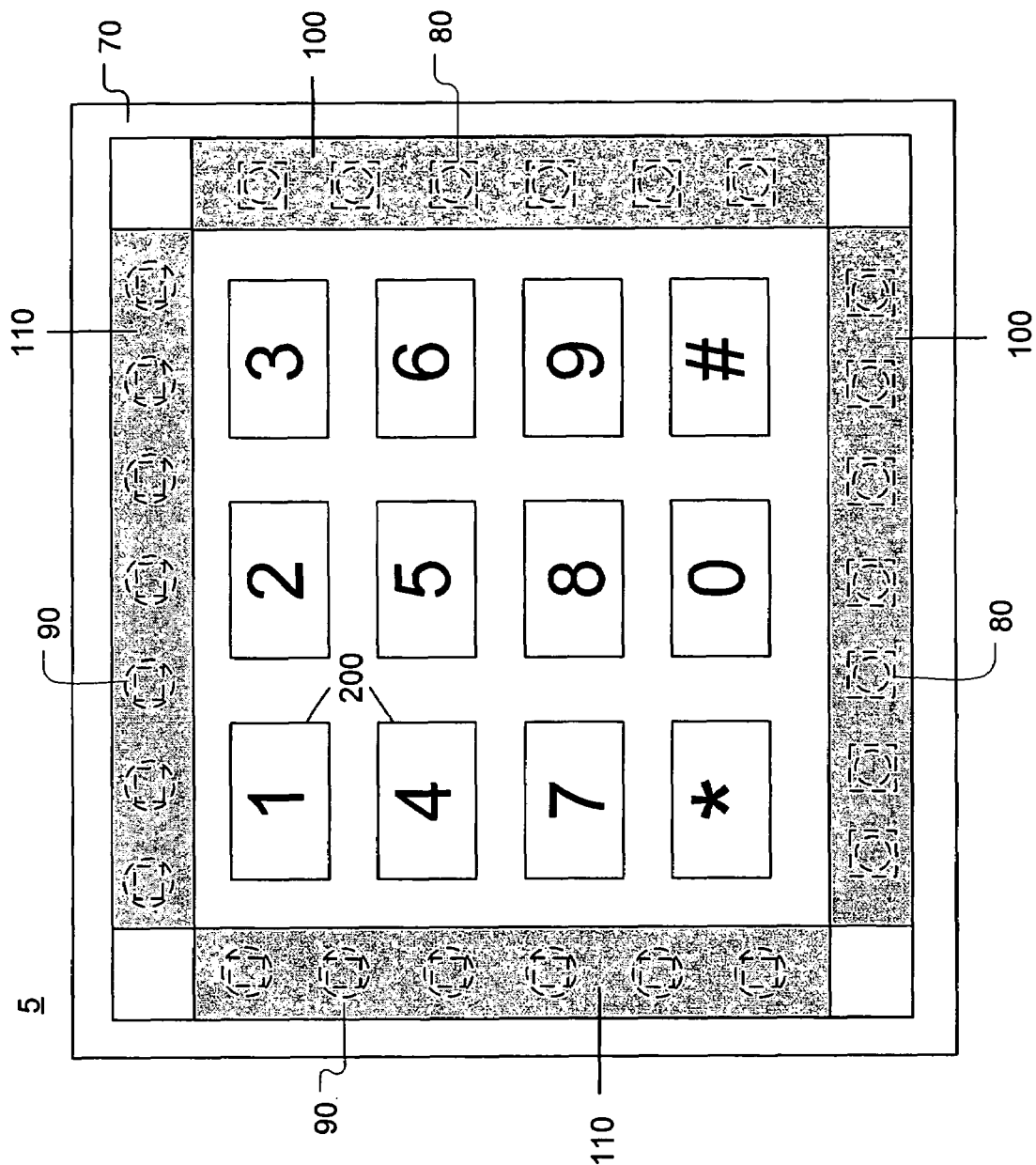
FIG. 3C illustrates a front view of an LCD device incorporating probe light sources along two adjacent edges and probe light sensing devices along the two opposing adjacent edges within the LCD device, according to an exemplary embodiment of the present invention.

In FIG. 3C, probe light sources 80 are disposed along two adjacent edges (bottom and left-side) within the LCD device 5 behind the reflective elements 100 (as indicated by broken lines). Also, probe light sensing devices 90 are disposed along the other two adjacent edges, behind the reflective elements 110 (as indicated by broken lines). Furthermore, FIG. 3C illustrates a particular example of a touchscreen application where the user is presented with touchscreen keys 200 corresponding to traditional numerical keys of a push-button telephone. Of course, this type of touchscreen application is purely exemplary. The quantity, size, shape, etc. of the touchscreen buttons may be varied according to the particular needs and design parameters for the LCD device 5.

Figure 4C:
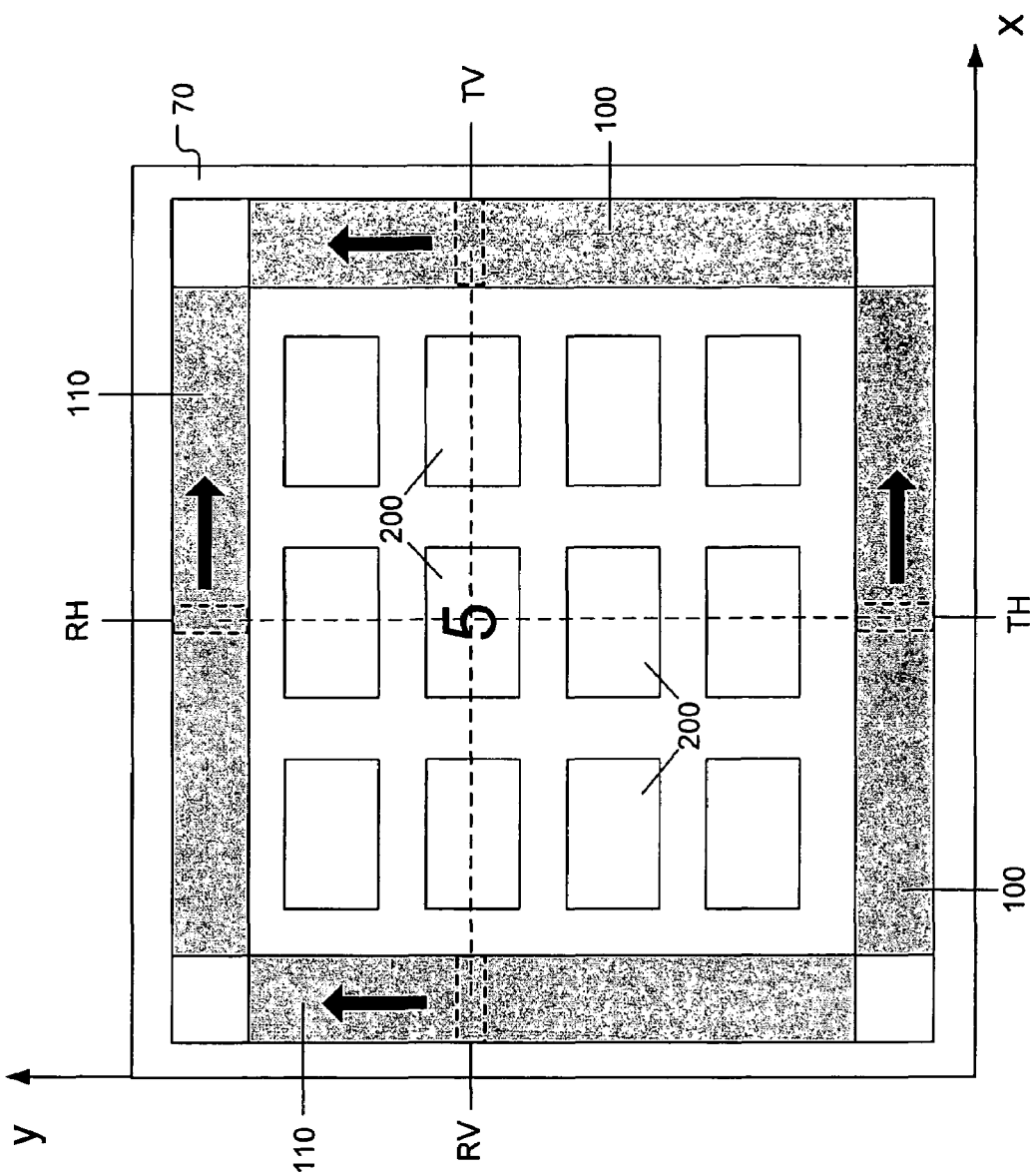
FIG. 4C illustrates the use of probe light openings in the LC layer to scan through a plurality of touchscreen keys to determine both horizontal and vertical location coordinates for the user contact, according to an exemplary embodiment of the present invention.

Furthermore, FIG. 4C illustrates a pair of translucent openings TH and RH being scanned in the horizontal direction (x axis), and a pair of translucent openings TV and RV being scanned in the vertical direction (y axis). For example, based on the current scan locations of the translucent openings TH, RH, TV, and RV illustrated in FIG. 4C, a detected interruption in the probe light would indicate that the touchscreen key 200 labeled "5" is currently being touched by the user.

Figure 5A:
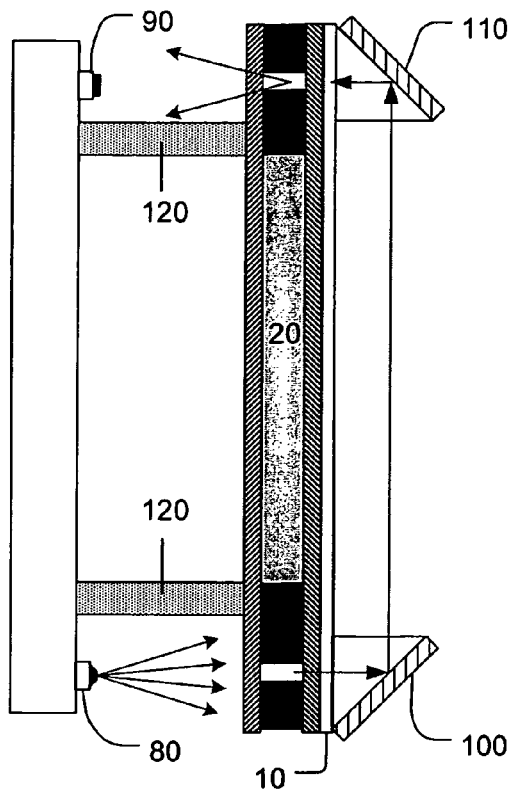
FIGS. 5A and 5B illustrate principles of operation for an LCD device in detecting user contact with the touchscreen surface, according to an exemplary embodiment of the present invention.
Figure 5B:
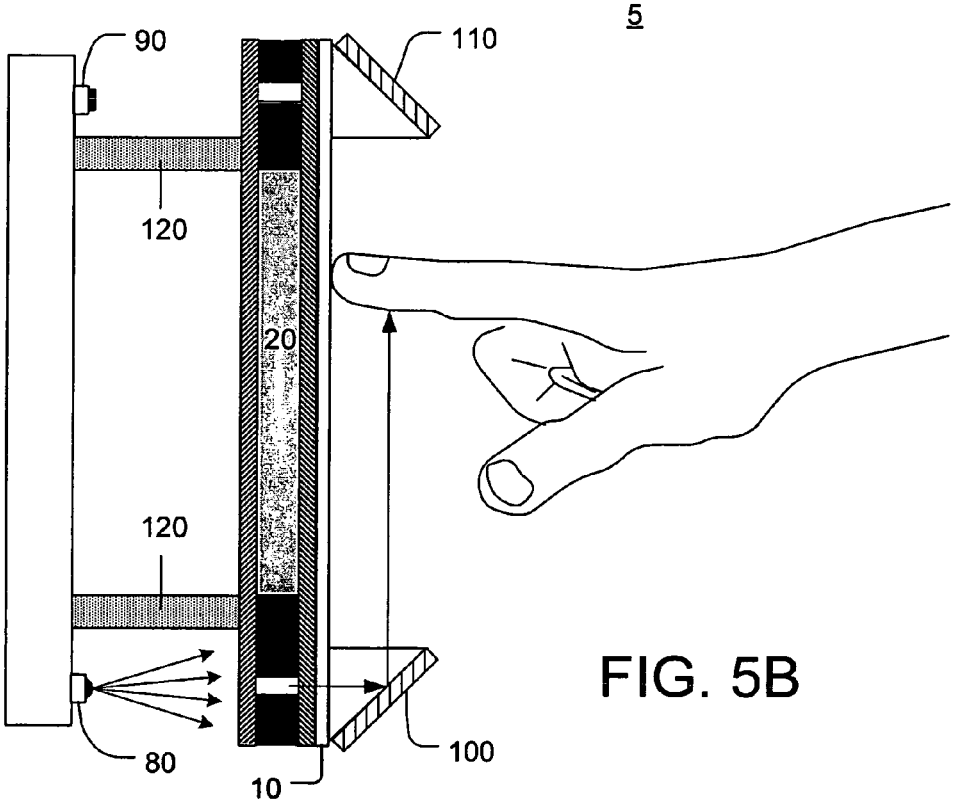

FIGS. 5A and 5B further illustrate the principles of operation for the LCD device 5 in detecting user contact with the touchscreen surface 10, according to an exemplary embodiment of the present invention. For purposes of illustration only, FIGS. 5A and 5B are consistent with the configuration shown in FIGS. 3A and 3B. However, it will be readily apparent to those of ordinary skill in the art that the principles illustrated in FIGS. 5A and 5B apply equally to other configurations described in this detailed description.

It should be noted that principles of the present invention may be applied in both backlit (transmissive) and reflective-type LCD devices. However, even though the LCD device 5 illustrated in FIGS. 5A and 5B may include one or more backlight sources, these figures do not illustrate the backlight source(s) as part of the LCD stack as a matter of convenience.

FIG. 5A illustrates an external optical path by which a probe light traverses from the probe light source(s) 80 to reflective element 100, across the touchscreen surface 10 to the reflective element 110, and back into the LCD stack toward sensing device(s) 90. As illustrated in FIG. 5A, the probe light passes through the LC layer 20 at a pair of translucent openings along the periphery. Since there is no user contact with the touchscreen surface 10, the probe light is unobstructed as it traverses the optic path. Thus, the probe light sensing device 90 measures a relatively high intensity of probe light.

However, FIG. 5B illustrates a user touching the touchscreen surface 10, thereby interrupting the probe light as it traverses the optical path. As a result, the probe light does not reach the probe light sensing device(s) 90, thus causing a significant decrease in the measured intensity. As discussed earlier, a degree of granularity is imposed on the probe light by the pair of translucent openings. Thus, the interruption of probe light, which is shown in FIG. 5B, occurs when the scan positions of the translucent openings correspond to location of the user's touch. Accordingly, at the moment the probe light sensing device(s) 90 sense(s) the interruption, a location coordinate of the user's touch along one of the xy axes may be determined based on the current scan positions of the pair of translucent openings.

Assuming that a pair of probe signals are being scanned across the touchscreen surface 10 (e.g., as illustrated in FIG. 4C), both (x, y) coordinates may be determined for pinpointing the location of the user's touch.

The following will describe various design considerations for the LCD device 5 to be considered, according to exemplary embodiments of the invention.

If the LCD device 5 is backlit, it would be advantageous to ensure that the probe light sensing device(s) 90 is/are sealed off from the backlight source(s) in the LCD stack. Similarly, for a reflective-type LCD device 5, it would be advantageous to ensure that the external light passing through the LC layer 20 does not interfere with the operation of the probe light sensing device(s) 90. Thus, the partitioning walls 120, which are illustrated in several of the accompanying figures, may be designed to seal or partition off the probe light sensing device(s) 90 from backlight/external light.

Figure 7:
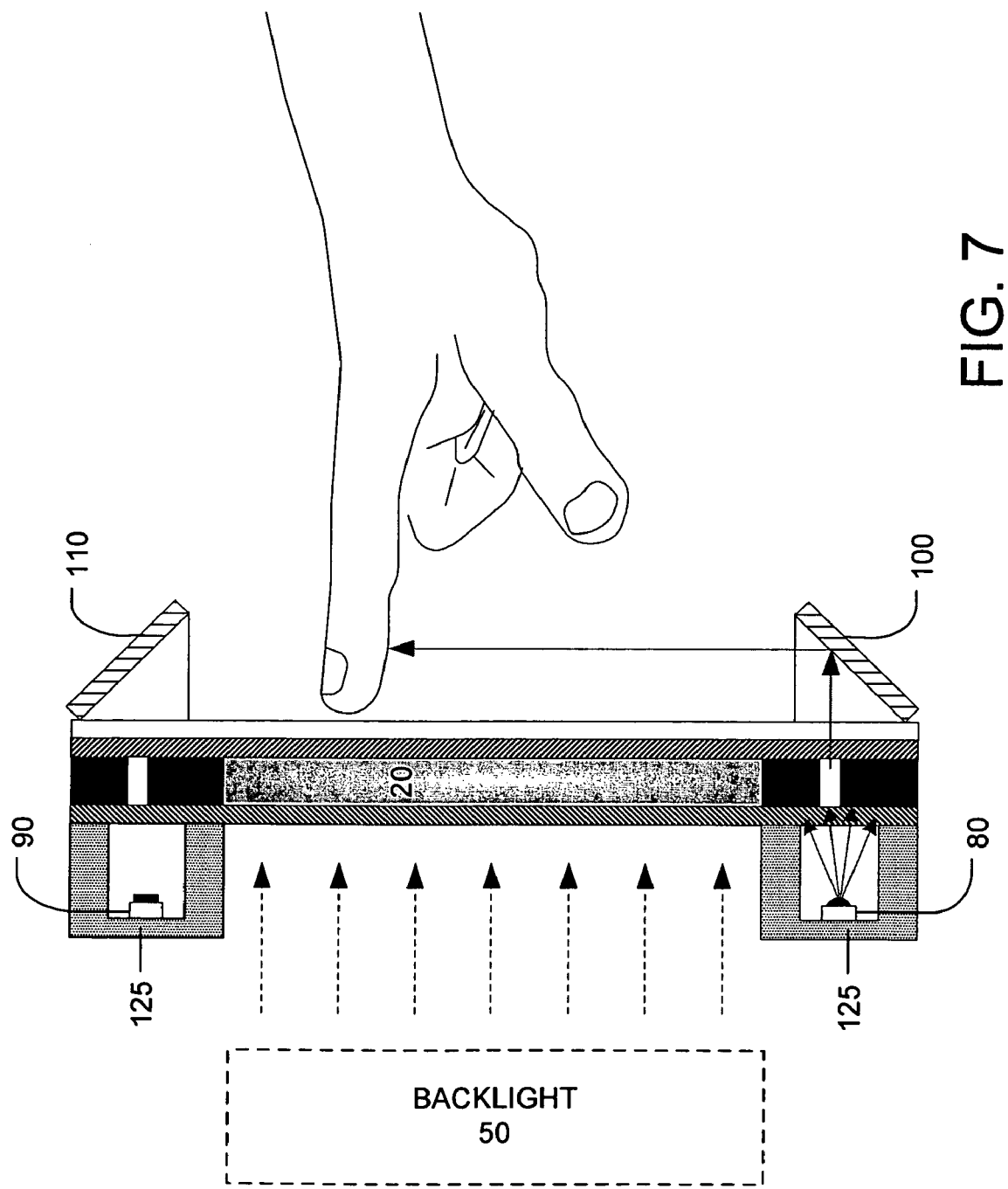
FIG. 7 illustrates an alternative configuration for sealing the probe light source and probe light sensing device from the backlight source, according to an exemplary embodiment of the present invention.

However, other configurations for partitioning or sealing off the probe light source(s) 80 and sensing device(s) 90 from the backlights are possible. For instance, FIG. 7 illustrates a possible alternative configuration for sealing the probe light source(s) 80 and probe light sensing device(s) 90 from a backlight source 50.

As another alternative, it may be possible to operate the LCD device 5 between interleaved modes of image display and touchscreen detection in order to prevent the probe light measurements from being skewed by backlight/external light. In other words, the LCD device 5 may switch between a mode in which it simply displaying the image (image display mode), and a mode in which it limits operation to the probe light source(s) 80 and sensing device(s) 90 to detect the user's touch (touchscreen detection mode). For example, it is contemplated that the device 5 may switch between these modes at interleaving rates of 60, 90, or 120 Hz.

Another possibility is to use a probe light, which is easily distinguished from the backlight or external light. For instance, the probe light source(s) 80 may be operated near or at infrared (IR) frequency. Thus, the probe light sensing device(s) 90 may be designed to demodulate and measure light of the same frequency as the probe light source(s) 80, thereby improving performance.

As discussed above, user contact with a particular touchscreen key 200 may be detected when the intensity level measured by the probe light sensing device(s) 90 decreases. To make such detections, the LCD device 5 may include a contact locating processor 300 designed to receive intensity measurements from the probe light sensing device(s) 90 and compare them to an appropriate threshold. This is illustrated in FIG. 6.

Figure 6:
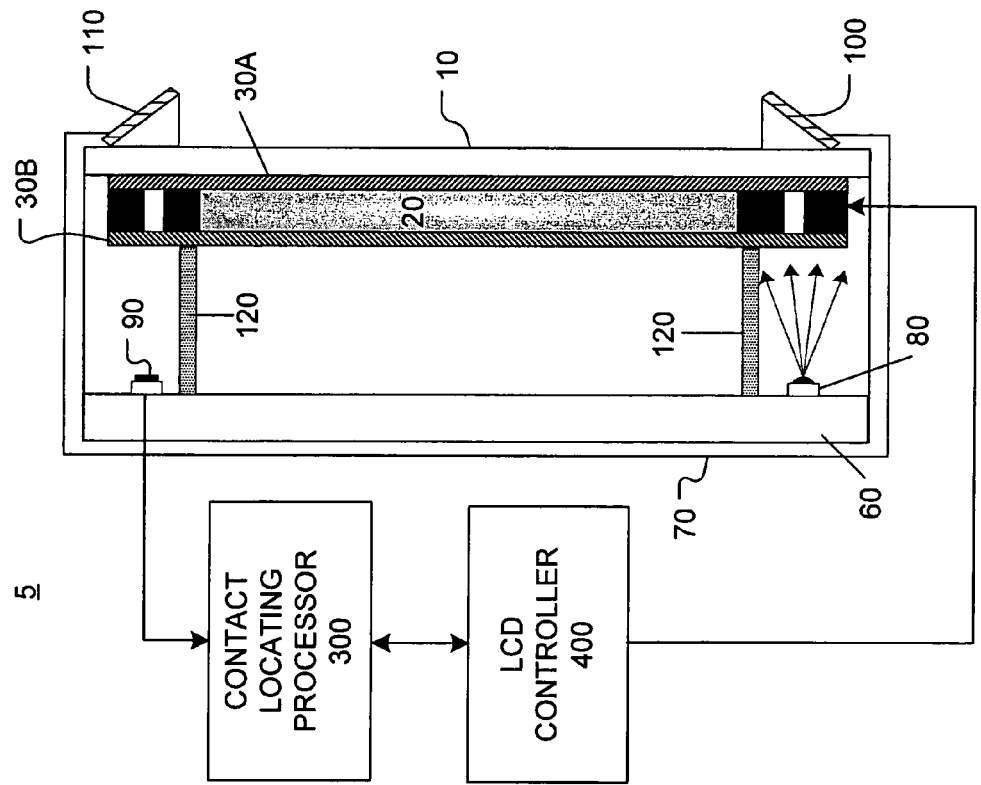
FIG. 6 illustrates additional components for controlling the touchscreen application in an LCD device, according to an exemplary embodiment of the present invention.

Specifically, FIG. 6 illustrates a contact locating processor 300 and LCD controller 400, which are used for controlling certain operations of the LCD device 5.

According to an exemplary embodiment, the LCD controller 400 of FIG. 6 may control operation of the LC layer 20 according to methods that will be understood by those of ordinary skill in the art. In addition to controlling the LC layer to display images (e.g., touchscreen keys 200) to the user, the LCD controller 400 may also be responsible for controlling the portions of the LC layer 20 underneath the reflective elements 100 and 110. Thus, the LCD controller 400 may be responsible scanning the various translucent openings along the corresponding edges of the touchscreen surface 10.

Referring again to FIG. 6, the contact locating processor may be designed to receive an intensity measurement from the probe light sensing device(s) 90 during each scan interval for the translucent openings. For each scan interval, the contact locating processor 300 may determine whether there is an interruption in the probe light across the optical path by comparing the measured intensity to a threshold. When the measurement dips below the threshold, an interruption is detected. Further, as the interruption is detected, the contact locating processor 300 may be notified, e.g., by the LCD controller 400, of the current scan locations of the translucent openings. Accordingly, the contact locating processor 300 may correlate these scan locations to a corresponding location coordinate(s) on the touchscreen surface 10. This allows the contact locating processor 300 to determine a location, e.g., (x, y) coordinates, on the touchscreen surface 10 that is currently being touched by a user.

Furthermore, it is contemplated that the contact locating processor 300 could adjust its threshold to compensate for a movement in the bias point of the probe light sensing device (s) 90. For example, such compensation may be necessary based on the level of ambient light entering the LC layer 20. Thus, the LCD device 5 may utilize an ambient light detector (not shown) in the LCD stack to help adjust the threshold.

Exemplary embodiments having been described above, it should be noted that such descriptions are provided for illustration only and, thus, are not meant to limit the present invention as defined by the claims below. Any variations or modifications of these embodiments, which do not depart from the spirit and scope of the present invention, are intended to be included within the scope of the claimed invention.

What is claimed is:

1. A liquid crystal display (LCD) device, comprising:
an external optical path for a probe light signal to traverse across a touchscreen surface, the external optical path comprising:
a first reflective element disposed at the periphery of the touchscreen surface along a first edge of the touch touchscreen surface;
a probe light source configured to transmit the probe light signal to the first reflective element,
a second reflective element disposed at the periphery of the touchscreen surface along an opposite edge of the touchscreen surface to the first edge, wherein the first reflective element is configured to reflect the probe light signal from the probe light source across the touchscreen surface to the second reflective element and the second reflective element being configured to reflect the probe light signal from the first reflective element to a probe light sensing device;

a probe light sensing device for detecting user contact with the touchscreen surface by sensing interruptions in the probe light signal traversing the external optical path; and a liquid crystal (LC) layer disposed behind a touchscreen surface, the LC layer being configured to:
set a first and a second peripheral portion to a state of opacity,
create a translucent opening in a first peripheral portion of the LC layer through which the probe light signal is transmitted from the probe light source to a first reflective element,
create a translucent opening in a second peripheral portion of the LC layer through which the probe light signal is reflected by the second reflective element to the probe light sensing device, and
scan the translucent openings through the first and second peripheral portions such that a location coordinate of the user contact is determined based on scan locations of the translucent openings by the probe light sensing device.

2. The LCD device of claim 1, further comprising:
a casing configured to hold the touchscreen surface in place, such that the casing and touchscreen surface are configured to provide an enclosure for:
the liquid crystal (LC) layer;
the probe light source disposed behind the LC layer, the probe light source being configured to transmit the probe light signal through the touchscreen surface, and
the probe light sensing device disposed behind the LC layer, the probe light sensing device being configured to sense the probe light signal, wherein
the probe light signal traverses from the probe light source, across an external face of the touchscreen surface, to the probe light sensing device via the external optical path, and
the user contact is detected in response to the probe light sensing device sensing an interruption of the probe light traversing the external optical path.

3. The LCD device of claim 2, wherein the first and second reflective elements are mirrors tilted substantially at 45 degrees with respect to the touchscreen surface.

4. The LCD device of claim 2, further comprising:
first and second probe light sources disposed behind the LC layer in the enclosure, which are configured to transmit the probe light signal through the touchscreen surface;
first and second probe light sensing devices disposed behind the LC layer in the enclosure, which are configured to sense the probe light signal,
wherein
a first external optical path is provided for the probe light signal from the first probe light source to traverse across the external face of the touchscreen surface to the first probe light sensing device, and
a second external optical path is provided for the probe light signal from the second probe light source to traverse across the external face of the touchscreen surface to the second probe light sensing device.

5. The LCD device of claim 4, wherein
the first probe light sensing device is operated to detect a horizontal location of the user contact, with respect to the touchscreen surface, by sensing an interruption of the probe light traversing the first optical path, and
the second probe light sensing device is operated to detect a vertical location of the user contact, with respect to the touchscreen surface, by sensing an interruption of the probe light traversing the second external optical path.

6. The LCD device of claim 4, wherein
the first external optical path comprises reflective elements, external to the enclosure, disposed at the periphery of the touchscreen surface along the top and bottom edges, respectively, and
the second external optical path comprises reflective elements, external to the enclosure, disposed at the periphery of the touchscreen surface along the left- and right-side edges, respectively.

7. The LCD device of claim 6, wherein
the first external optical path further comprises a pair of translucent openings in the LC layer corresponding to top and bottom edges, respectively, and
the second external optical path further comprises a pair of translucent openings in the LC layer corresponding to the left- and right-side edges, respectively.

8. The LCD device of claim 7, wherein
the LC layer is configured to:
simultaneously scan the translucent openings of the first external optical path in a horizontal direction along opaque portions of the top and bottom edges, respectively, and
simultaneously scan the translucent openings of the second external optical path in a vertical direction along opaque portions of the left- and right-side edges, respectively.

9. The LCD device of claim 8, further comprising:
a contact locating unit configured to:
receive intensity measurements from the first and second probe light sensing devices,
detect user contact with the touchscreen surface based on the received intensity measurements,
determine a horizontal coordinate based on the scan locations of the translucent openings of the first external optical path when the user contact is detected, and
determine a vertical coordinate based on the scan locations of the translucent openings of the second external optical path when the user contact is detected.

10. The LCD device of claim 2, wherein the probe light source is a light-emitting diode (LED).

11. The LCD device of claim 2, wherein the probe light source is configured to operate in the infrared range.

12. The LCD device of claim 2, wherein the probe light source and the probe light sensing device are partitioned off from a backlight source in the enclosure.

* * * * *